July 30, 1935. L. SANCHEZ-VELLO 2,009,793
PROCESS FOR THE MANUFACTURE OF GLASS TUBES AND
AUTOMATIC APPARATUS EMBODYING THE SAME
Filed May 26, 1930 4 Sheets-Sheet 4
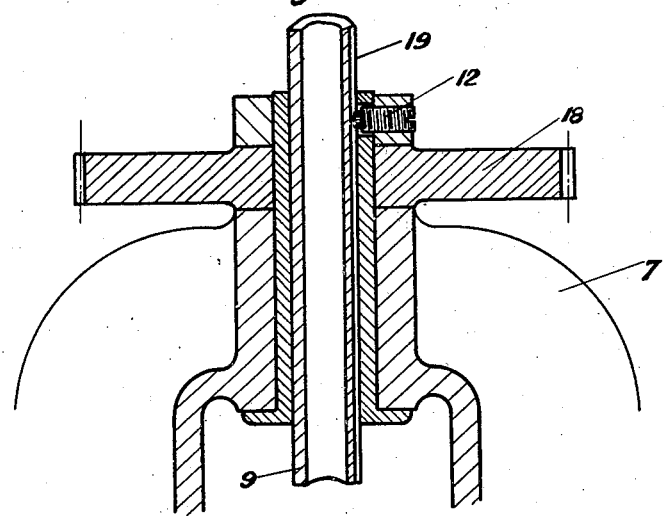
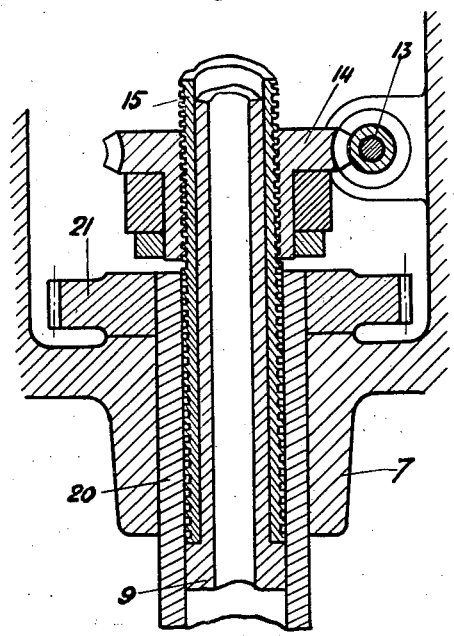
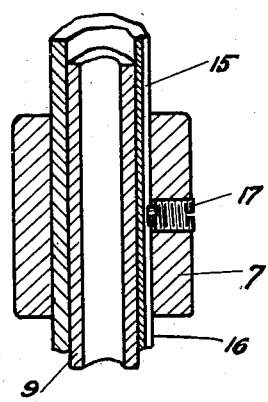
Inventor:-
Leopoldo Sanchez-Vello Patented July 30, 1935

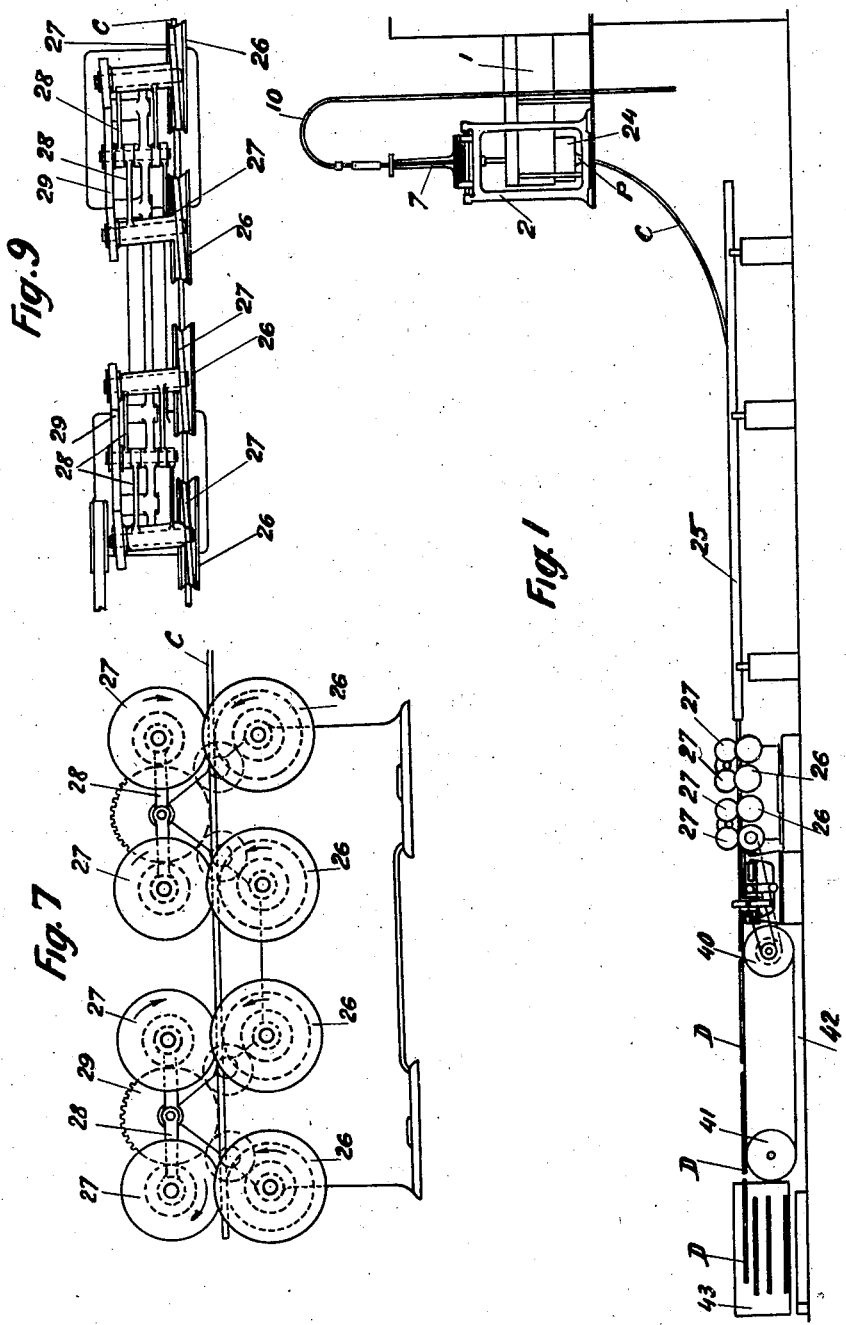

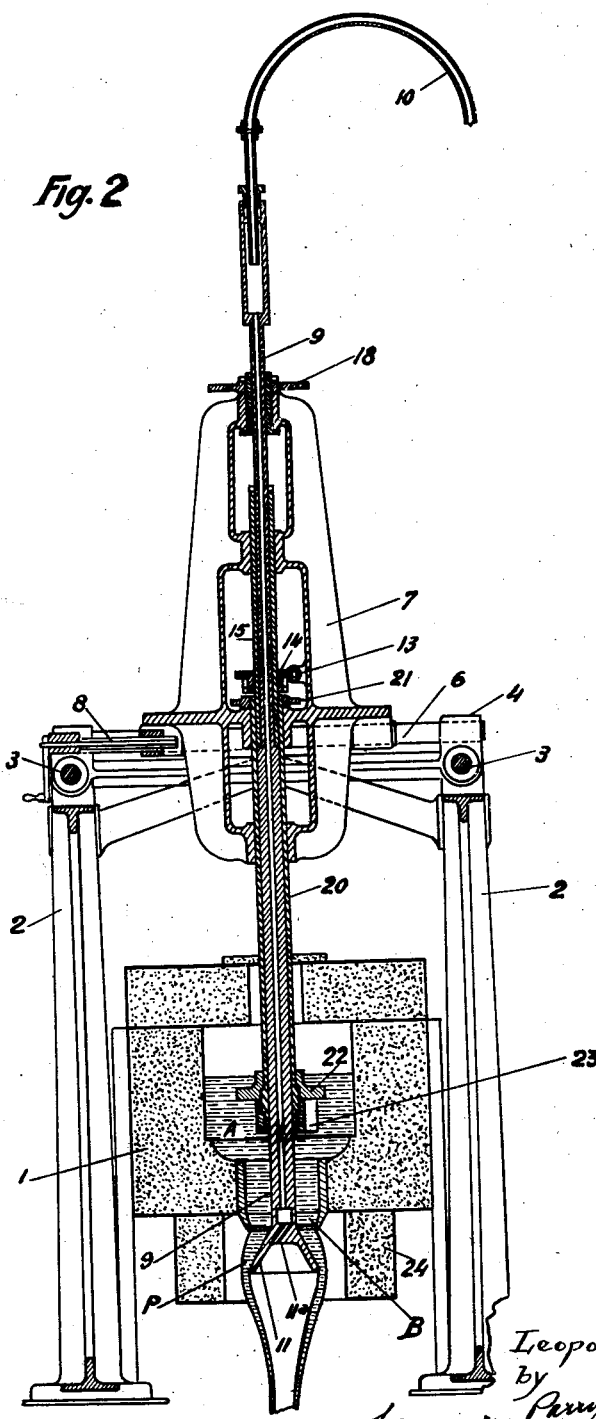

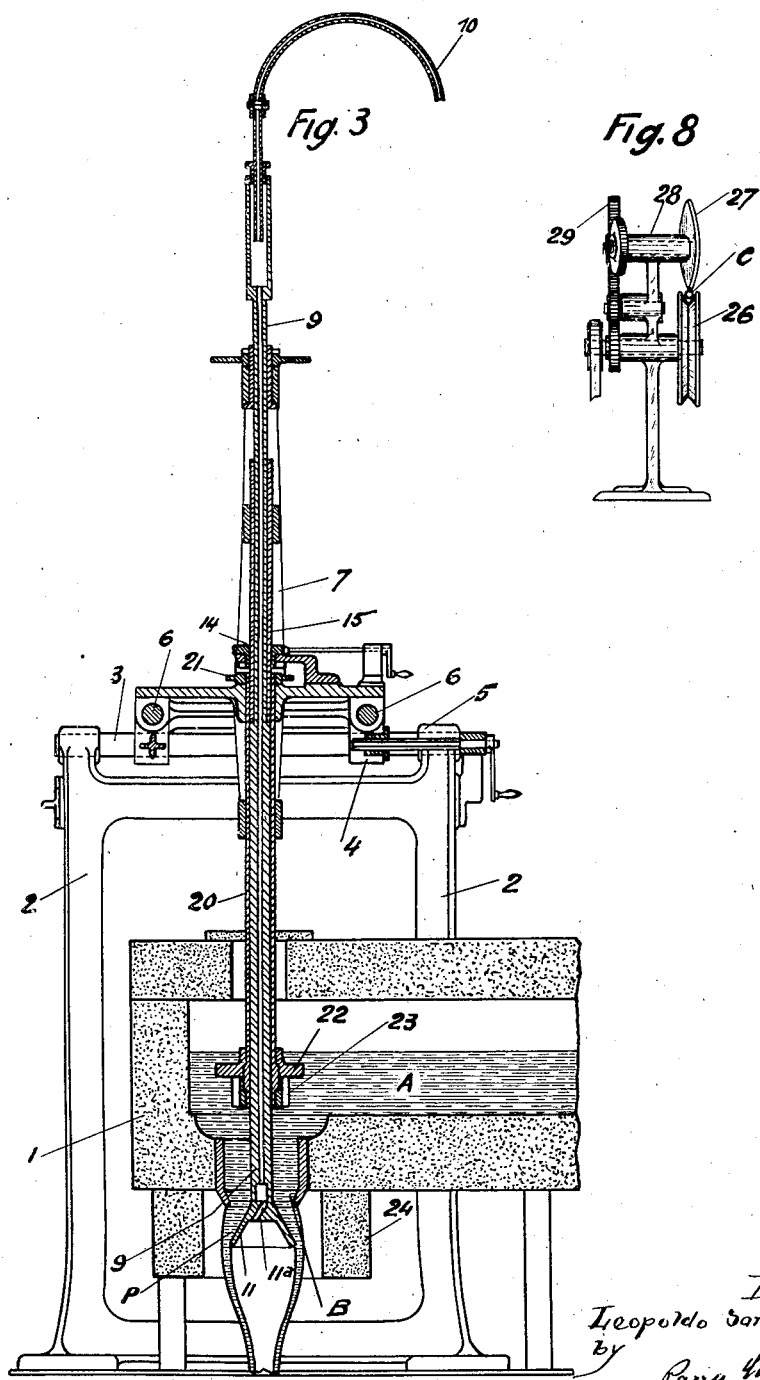

2,009,793

UNITED STATES PATENT OFFICE 2,009,793

PROCESS FOR THE MANUFACTURE OF GLASS TUBES AND AUTOMATIC APPARATUS EMBODYING THE SAME

Leopoldo Sanchez-Vello, Nogent-sur-Marne, France, assignor to Maatschappy tot Beheer en Exploitatie van Octrooien, The Hague, Netherlands Application May 26, 1930, Serial No. 455,836
In France June 8, 1929

10 Claims. (Cl. 49—17.1)

In the manufacture of glass tubes the following variable factors are to be considered, namely, the external diameter, the internal diameter, the coincidence of the centres of the inner and outer circumferences, or uniform thickness of the walls, the circular cross section, the cylindrical shape, and the straight form of the tube.

The present invention relates to a process for the manufacture of glass tubes which makes it possible to act during the working, upon the causes that determine the aforesaid variable factors, and also to an automatic machine for the continuous manufacture of glass tubes by means of said process.

The accompanying drawings show by way of example various embodiments of the invention.

Figure 1 is a general view of constructional form of the automatic machine.

Figure 2 is a front sectional view of the front part of the machine which is connected with the melting furnace.

Figure 3 is a corresponding side view.

Figures 4, 5 and 6 are sectional views, on a larger scale, of the principal parts of the arrangement shown in Figure 3.

Figure 7 is an elevational view, partly in section, of the rotary glass-drawing device, Figure 8 is a detail of the tube carrying and rotating mechanism, and Figure 9 is a plan view corresponding to Figure 7.

Referring to Figures 1, 2, and 3, it is observed that the melting furnace, in which the glass is melted and refined, comprises an extended part 1 which together with the front part of the apparatus is supported by a suitable platform. Said front part of the apparatus comprises two uprights 2 carrying the guiding bars 3 upon which the carriage 4 may be caused to slide by turning the screw 5; said carriage is provided with rods 6 upon which the support 7 together with all devices mounted thereon can be made to slide by turning the screw 8 in a direction at right angles to the motion given by the screw 5.

Coaxially with said support 7 is mounted the blowing device, which comprises the blowtube 9 in which is circulated compressed air supplied from a main piping through a flexible tube 10; at the lower part of said tube 9 is a tapered valve 11 pierced with a spiral aperture 11ª. Said blowtube may be raised or lowered by turning the worm 13 cooperating with the worm wheel 14, which serves as a nut for the threaded tube 15, which may move vertically but is held against rotation by a groove 16 and a stud 17. Said blowtube 9 may be rotated independently of the vertical motion, by means of the gear wheel 18 which is connected to an electric motor through suitable mechanical means, and is keyed to tube 9 by means of a keyway 19 in said tube in which the key 12 is slidably mounted.

Said support 7, mounted concentrically with the blowtube sustains the equalizing and mixing mechanism, which comprises a continuously rotating tube 20 actuated by a gear wheel 21 driven by an electric motor, through any suitable intermediate gear; at the lower part of said tube 20 is provided a disk 22 and a member 23 comprising a plurality of blades or wings.

At the outlet of the hole B for the discharge of the melted glass A is disposed a furnace 24 comprising an annular burner or a circular row of burners surrounding the tapered valve 11.

A guiding member 25 connects the front part of the apparatus to its rear part comprising the rotary glass drawing device, the cutting device, the separating mechanism, and the glass tube discharging mechanism.

The rotary glass drawing device (Figures 7, 8, and 9) comprises a certain number of grooved pulleys 26 rotating in the same direction, above which is mounted a corresponding set of rollers 27 rotating in the opposite direction and mounted on arms 28 rotatable about the axis of the gear wheels 29 that serve to rotate said rollers. Furthermore said rollers 27 possess the particular feature that their axes of rotation are inclined with reference to the axis of rotation of the grooved pulleys 26, as shown in Figures 8 and 9.

The separating mechanism (Figure 1) consists of two pulleys 40—41 connected together by a belt 42 whose speed is greater than the peripheral speed of the grooved pulleys 26 of the rotary glass drawing mechanism.

Following said separating mechanism is an inclined plane 43 which constitutes the discharging device.

The operation of the apparatus is as follows:—

The melted glass A flows from the melting furnace into the extension 1 and arrives above the discharge orifice B, at which point it is made homogeneous as to temperature and viscosity by the rotation of the blades of the device 23, whilst the disk 22 prevents the formation of a hollow or depressed part at the surface of the glass and around the blowing tube 9. Without the presence of said disk 22, such a hollow would take place under the combined action of the exit of glass through the orifice B and of the pressure of flame within the furnace, and would result in the stream of glass drawing along with it gas bubbles, or even in a blowing of the glass by the flame if the hollow became deeper.

The discharge of the stream of glass issuing from the orifice B is regulated by the vertical position of the tapered valve 11 owing to the vertical movement of the blowing tube 9, and this regulation can be effected during the working, whether it be desired to obtain a tube with thicker walls, or it be wanted to increase the output of the machine, or otherwise, in case of the viscosity having increased by reason of an excessive heating of the furnace it be desired to reduce the flow section used for a glass which is more fluid and proceeds more rapidly.

Around the valve 11, the glass forms a lump or mass P which is blown and made hollow by the current of pressed air supplied through the blowtube 9, but in order to make the substance of this mass more homogeneous, the tube can be rotated about its axis, and said mass be heated by the furnace 24 or the circular row of burners surrounding the tapered valve 11. This rotation of the mass is maintained even after it has ceased to be in contact with the said valve, since the current of air passing through the blowtube 9 has, when issuing from the spiral aperture 11ª, a whirling motion which is imparted to said mass.

But the change in the direction of said continuous mass of melted glass which flows vertically and is drawn out in a practically horizontal direction, results in the central hole of the tube becoming eccentric with reference to the external circumference, this being due chiefly to the differences in the radii of curvature of the various generatrices of the surface of the melted mass which is thus curved on account of its change of direction. This defect is obviated by making the tapered valve 11 eccentric with reference to the orifice B, an adjustment which is made possible by the fact that the support 7 and hence the valve 11 can be displaced in both horizontal directions and this produces a hollow mass of melted glass the thickness of which is not uniform and which is such that when the glass has been drawn out, this difference of thickness will compensate for the formation of thin parts occasioned by the differences in the radii of curvature.

The lump or mass of glass is drawn out by the traction exerted upon it by the rotary drawing mechanism (Figures 1, 7, and 9) the speed of which can be modified according to the diameter of the tube which it is desired to obtain, this traction being caused by the adhesion of the tube to the grooved pulleys 26 and to the rollers 27. Said rollers can be adapted to the differences in the diameter of the resulting tube, on account of the rotation that can be given to arms 28 about the axis of the gear wheels 29. But the tube which is formed when said mass of glass is drawn out, would, when displaced along the guide 25, be more strongly cooled along the upper generatrix which is more exposed to the cooling of the air than along the lower generatrix which is always in contact with said guide 25, and this unequal cooling would result in giving a certain curvature to the piece of tube finally produced by the machine. This drawback is avoided in the present process by imparting to the tube, along the whole length of the guide 25, a movement of rotation about its axis, this being obtained in the apparatus by giving to the axis of rotation of the rollers 27 an oblique direction with reference to the axis of rotation of the grooved wheels 26, so that the rollers 27 tend to roll upon the tube in a helical path, and can only move by turning about their axles, thus rotating the tube which they draw forward.

When issuing from the said rotary drawing mechanism, the tube C passes to the mechanism adapted to split the tube, which mechanism may be of any desired construction.

The tube thus split is cut up into lengths or sections D by the separating device for since the belt 42 moves horizontally in the same direction as the tube and at a greater speed than the latter, and since the tube rests upon the said belt, the adhesion of the tube to the belt causes a traction of the tube, and it is thus drawn apart or separated at the point at which the tube is cut or marked by the disks 30 and 31.

The lengths or sections of the tube which are thus separated are then transported by the belt of the separating device at a greater speed, and the successive sections of tube that are thus spaced apart are deposited upon the inclined plane that is employed for the discharge of the tubes and by which the tube is rotated in the simplest manner while it is cooled, an operation which is comprised in the process covered by the invention. In fact, the sections of tube thus deposited by the separating device upon said inclined plane roll along this inclined plane, and this movement of rotation prevents the tubes from twisting while cooling, and it even corrects any deviations from straightness since the tubes are still somewhat yielding and deformable. The said tubes are finally discharged into suitable boxes.

In view of the present description of the automatic machine and of its functioning, the process according to the invention is readily understood. The said process makes it possible to obtain a glass tube in a direct and continuous manner from melted and refined glass, without requiring any intermediate operations, treatments or manipulations.

The said process comprises the following essential features:—

(a) The viscosity of the glass is made uniform by mixing the various parts or layers of glass which are unequally heated.

(b) The apparatus obviates the formation of a hollow or depressed part at the surface of the glass, by the arrangement of a screen disposed above the discharge hole, thus preventing the current of melted glass from drawing along with it gas bubbles and the flame of the furnace from blowing the lump or mass of melted glass.

(c) The discharge of the glass from the outlet hole is regulated by the varying of the size of this hole, optionally combined with the heating of the mass of glass, which increases its fluidity and consequently its rate of flow.

(d) The lump or mass of glass is rotated by the rotation of the blowing tube around which it is continuously discharged, but this rotation does not draw out the melted glass, which action takes place solely by gravity.

(e) This rotation of the mass of glass is effected in the part of the mass which is no more in contact with the blowing tube, by a whirling movement of the current of blowing air.

(f) The apparatus effects the blowing of a mass of glass which has not a uniform thickness, so as to compensate for the thinning of the wall due to the change of direction or of curvature of the mass of glass while drawn out, thus obtaining a tube of uniform thickness.

(g) The cooling of the tube, from the region in which the mass of glass, is drawn out, to the point at which it is cut up into sections, is regulated by rotating said tube about its axis during the whole movement.

(h) The apparatus mechanically cuts the tube into sections, by first splitting the tube and subjecting it immediately after to a traction.

(i) The apparatus maintains or corrects the straightness of the tube sections by their rotation about their axis while cooling.

What I claim is:—

1. Process for manufacturing in a continuous manner glass tube from melted glass flowing vertically through an annular discharge hole which consists in stirring said melted glass immediately above said hole, in varying the surface of the discharge opening so as to regulate the rate of discharge, in blowing into the melted mass below the discharge hole a current of compressed air having a whirling motion, in giving to the discharge hole an unsymmetrical section, so that the mass that flows through it is given a nonuniform thickness, in drawing out the tube thus obtained in a horizontal direction, in rotating said tube about its axis during this drawing out operation so as to obtain a uniform cooling, in splitting the tube into parts and separating said parts.

2. Process for manufacturing in a continuous manner glass tube from melted glass flowing vertically through an annular discharge hole, which consists in interposing a screen above said hole so as to prevent the formation of a depression at the surface of the bath of melted glass, in stirring said glass immediately above said hole, in varying the surface of the discharge opening so as to regulate the rate of discharge, in blowing into the melted glass below the discharge hole a current of compressed air having a whirling motion, in giving to the discharge hole an unsymmetrical section so that the mass that flows through it is given a nonuniform thickness, in drawing out the tube thus obtained in an horizontal direction, in rotating said tube about its axis during this drawing out operation so as to obtain a uniform cooling, in splitting the tube into parts and separating said parts.

3. Process for manufacturing in a continuous manner glass tube from melted glass flowing vertically through an annular discharge hole, which consists in interposing a screen above said hole so as to prevent the formation of a depression at the surface of the bath of melted glass, in stirring said glass immediately above said hole, in varying the surface of the discharge hole and simultaneously heating the melted mass so as to regulate the rate of discharge, in blowing into the melted glass below the discharge hole a current of compressed air having a whirling motion, in giving to the discharge hole an unsymmetrical section so that the mass that flows through it is given a nonuniform thickness, in drawing out the tube thus obtained in a horizontal direction, in rotating said tube about its axis during this drawing out operation so as to obtain a uniform cooling, in splitting the tube into parts and in separating said parts by traction.

4. An apparatus for manufacturing in a continuous manner glass tube from melted glass which comprises a receptacle for receiving the melted glass provided with a hole at its lower part, a blowtube passing through said hole, means for rotating said tube, a disc mounted on said tube and adapted to prevent the formation of a depression at the surface of the melted glass, blades on said tube for stirring the melted glass, a conical extension at the lower end of said tube adapted to partially obturate the hole at the bottom of the receptacle for melted glass and into which opens the blowtube, means for vertically displacing said tube, means for displacing said tube in two perpendicular horizontal directions, means for drawing out the glass tube thus obtained and simultaneously rotating said glass tube about its axis, means for splitting said glass tube into parts and means for separating said parts from each other.

5. An apparatus for manufacturing in a continuous manner glass tube from melted glass which comprises a receptacle for receiving the melted glass provided with a hole at its lower part, a blowtube passing through said hole, means for rotating said tube, a disc mounted on said tube and adapted to prevent the formation of a depression at the surface of the melted glass, blades on said tube for stirring the melted glass, a conical extension at the lower end of said tube adapted to partially obturate the hole at the bottom of the receptacle for melted glass and into which opens the blowtube, means for vertically displacing said tube, means for displacing said tube in two perpendicular horizontal directions, a plurality of rollers for drawing out in an horizontal direction the glass tube that is obtained, a plurality of cooperating rollers the axes of which have an oblique direction with reference to the axis of rotation of the first mentioned rollers so as to impart to the glass tube a rotation about its axis, means for splitting said tube into parts and means for separating said parts from each other.

6. An apparatus for manufacturing in a continuous manner glass tube from melted glass which comprises a receptacle for receiving the melted glass provided with a hole at its lower part, a blowtube passing through said hole, means for rotating said tube, a disc mounted on said tube and adapted to prevent the formation of a depression at the surface of the melted glass, blades on said tube for stirring the melted glass, a conical extension at the lower end of said tube adapted to partially obturate the hole at the bottom of the receptacle for melted glass, and into which opens the blowtube, means for vertically displacing said tube, means for displacing said tube in two perpendicular horizontal directions, a plurality of rollers for drawing out in an horizontal direction the glass tube that is obtained, a plurality of cooperating rollers the axes of which have an oblique direction with reference to the axis of rotation of the first mentioned rollers so as to impart to the glass tube a rotation about its axis, means for splitting said tube into parts and a conveyer belt adapted to move at a speed exceeding that of the glass tube so as to separate the glass sections from each other.

7. The hereinbefore described method of continuous fabrication of tubing from a bath of molten glass which comprises issuing the glass in tubular form through a vertical annular passage around a rotating member to form a hollow body, rotating the hollow body by air jets directed into the interior thereof below the orifice, and removing the tube in a horizontal direction while rotating the same.

8. The hereinbefore described method of continuous fabrication of tubing from a bath of molten glass which comprises issuing the glass in tubular form through a vertical annular passage, and around a rotating mandrel, and thence over a rotating cone located immediately below the orifice, and rotating the hollow body by air jets directed into the interior thereof below the orifice.

9. In a tube forming apparatus, the combination with a glass container having a submerged orifice, of a hollow mandrel mounted in the orifice and projecting therein, an annular projection on the mandrel below the glass level, vanes on the mandrel and in the container below the annular projection, and means for rotating the mandrel.

10. In a tube forming apparatus the combination with a glass container having a submerged orifice, of a hollow mandrel mounted in the orifice and carrying an enlarged cone below and adjacent to the orifice, means for rotating the mandrel and cone, and air ports in the cone inclined to the radii thereof directing air on the interior wall of the hollow body produced by the cone.

LEOPOLDO SANCHEZ-VELLO.